US00RE40869E

(19) United States
(12) Reissued Patent
Leslie et al.

(10) Patent Number: US RE40,869 E
(45) Date of Reissued Patent: Aug. 18, 2009

(54) DRAG LINE BUCKET CONTROL

(76) Inventors: Bruce Alexander Leslie, 4 Cole Street, Redbank Queensland 4301 (AU); Craig William Broadbent, 72 Goman Street, Sunnybank Hills Queensland 4109 (AU)

(21) Appl. No.: 11/409,541

(22) Filed: Apr. 21, 2006

Related U.S. Patent Documents

Reissue of:
(64) Patent No.: 6,588,126
Issued: Jul. 8, 2003
Appl. No.: 09/834,147
Filed: Apr. 12, 2001

(30) Foreign Application Priority Data

Apr. 13, 2000 (AU) ..... PQ6887
May 19, 2000 (AU) ..... PQ7644

(51) Int. Cl.
*E02F 3/48* (2006.01)
*E02F 3/52* (2006.01)

(52) U.S. Cl. ..... 37/394; 37/396; 37/397; 37/399; 37/401

(58) Field of Classification Search ..... None
See application file for complete search history.

(56) References Cited

U.S. PATENT DOCUMENTS

| | | | | | |
|---|---|---|---|---|---|
| 860,103 | A | * | 7/1907 | Newman | 254/285 |
| 881,330 | A | * | 3/1908 | Newman | 37/395 |
| 1,095,335 | A | * | 5/1914 | Little | 37/395 |
| 1,236,691 | A | * | 8/1917 | Dunlop | 37/395 |
| 1,248,600 | A | * | 12/1917 | Bathrick | 254/285 |
| 1,316,058 | A | * | 9/1919 | Pugh | 37/396 |
| 1,385,543 | A | * | 7/1921 | Harman | 37/395 |
| 1,691,100 | A | * | 11/1928 | Wilson | 37/395 |
| 2,030,590 | A | * | 2/1936 | Holman et al. | 104/169 |
| 2,120,444 | A | * | 6/1938 | Smith | 37/341 |
| 2,133,406 | A | * | 10/1938 | Shelton et al. | 254/397 |
| 2,269,917 | A | * | 1/1942 | Repplinger | 37/403 |
| 2,482,829 | A | * | 9/1949 | Adams | 37/396 |
| 3,365,823 | A | * | 1/1968 | Vogt | 299/8 |
| 3,776,513 | A | * | 12/1973 | Mosley | 254/356 |
| 3,829,992 | A | * | 8/1974 | Reid et al. | 37/103 |
| 3,877,581 | A | * | 4/1975 | Auxer | 212/195 |
| 4,040,667 | A | * | 8/1977 | Tax et al. | 299/8 |
| 4,167,072 | A | * | 9/1979 | Johansson | 37/395 |
| 4,171,053 | A | * | 10/1979 | Cecce | 212/58 |
| 4,509,895 | A | * | 4/1985 | Baron | 254/344 |
| 5,507,596 | A | * | 4/1996 | Bostelman et al. | 405/191 |

FOREIGN PATENT DOCUMENTS

| | | | |
|---|---|---|---|
| AU | 38089/78 | * | 8/1979 |
| AU | 34502/89 | * | 5/1988 |
| AU | 580116 | * | 1/1989 |
| GB | 389858 | * | 3/1933 |
| RU | 972008 | * | 11/1982 |
| WO | WO 85/04916 | * | 11/1985 |

OTHER PUBLICATIONS

ISD's Research Areas Website, Robocrane Project, Large Scale Manufacturing Using Cable Control.*

* cited by examiner

*Primary Examiner*—Thomas A Beach

(57) ABSTRACT

A dragline excavation bucket control system including a pair of hoist ropes and a drag rope, the hoist ropes being coupled adjacent opposite ends of the bucket. The hoist ropes are supported on spaced sheaves on an excavation boom whereby the hoist ropes extending between the boom and bucket are substantially parallel and the boom support points and bucket attachment points for the hoist ropes are controllable to maintain an optimal carry attitude for a bucket when in use.

25 Claims, 11 Drawing Sheets

DRAG LINE BUCKET CONTROL

Matter enclosed in heavy brackets [ ] appears in the original patent but forms no part of this reissue specification; matter printed in italics indicates the additions made by reissue.

THIS INVENTION is concerned with improvements in bucket control systems for dragline excavators.

The invention is particularly, although not exclusively, concerned with bucket dump control systems for dragline excavators.

A typical dragline bucket is controlled by two cables or 'ropes'—a hoist rope, and a drag rope.

It is noted that where a singular 'rope' is referred to herein, this may, and often does, refer to two or more equalised ropes travelling uniformly and performing identical functions.

The hoist rope is pivotally connected via a load equalizer and hoist chains to trunnions towards and on opposite sides of the rear of the bucket and extends over a sheave at the tip of the excavator boom to the drum of a winch.

The drag rope is coupled via a drag linkage to draw chains in turn coupled on opposite sides of the open mouth of the bucket. Also coupled to the drag linkage is a dump control cable which extends over a dump sheave attached to the hoist load equalizer and back to a mounting lug on a transverse arch extending over the open mouth of the bucket or to the sides of the bucket front. The drag rope extends unsupported between the drag drum of the winch and the drag linkage coupled by draw chains to the front of the bucket.

It is widely held that dragline buckets possess three degrees of freedom—the x and y axes, and the carry angle of the bucket.

In a conventional two rope dragline, the vertical and horizontal positions of the bucket are controlled by the paid out length of the hoist rope and the drag rope. The bucket carry angle is controlled implicitly by the relative lengths of the draw chains, hoist chains, dump rope and connecting links, and the positional masses of the bucket, rigging and payload.

Due to the geometric balance, the carry angle reduces as the bucket moves from the base of the boom to vertically under the boom point. The maximum payload carried by the bucket occurs for only a narrow band of carry angle, with reduced payloads for carry angles higher and lower than this band. Accordingly, the carry angle is at best a compromise between the bucket geometry rigging design and operational requirements.

The dump zone for the bucket is determined by trigonometric stability of the loaded bucket. Generally speaking, at a predetermined distance along the boom, usually more than two thirds of its length, the tensions in the drag rope, draw chain and dump rope, reduce to the point where the dump rope force is no longer sufficient to support the front of the bucket, which rotates about the hoist trunnions to dump the bucket load.

The compromise in bucket carry angle means that efficiencies in the excavation process are lost by bucket spillages, particularly when the bucket is hoisted either close to the base of the boom or more than halfway along the boom. Another limitation of such a rigging design is that generally it is not possible to dump either inside or outside the implicit dump radius controlled by the geometric balance mentioned after.

A prior art two rope—bucket rigging system is described generally in Australian Patent Application No 28097/99 which relates to an improved bucket rigging for a conventional two rope system.

Australian Patent Application No 34502/89 proposes a three cable bucket control system having two hoist ropes and a drag rope. In this proposal, the effective paid out length of the two hoist ropes are independently controllable. This system suggests three controllable degrees of freedom and avoids the compromises with the bucket carry angle of the two rope systems.

The hoist ropes extend over respective sheaves at the tip of the boom, one such hoist rope being coupled via hoist chains to the hoist trunnions of the bucket. The other hoist rope is coupled to the mounting lug on the transverse arch over the mouth of the bucket.

The bucket is moved from a loaded transport position to a dump position by shortening either of the rear mounted or front mounted hoist ropes relative to the other to achieve load dumping from the open mouth of the bucket or rearwardly through the selectively operable hatch. Independent control of the paired hoist ropes is achieved by a radial arm pivoted on the boom support tower. The radial arm has a sheave mounted on the free end over which one of the hoist ropes passes. A hydraulic cylinder is actuable to move the radial arm and sheave whereby one hoist rope is shortened relative to the other.

When the bucket is in a horizontal attitude, the bucket support is represented by a triangulated support surface having one support point at the tip of the boom, another support point at the hoist trunnions, and the third support point at the mounting lug on the bucket arch.

The three rope system is potentially superior to the two rope system in that its effective excavation radius is greater and it permits a greater degree of selectivity in the dump zone position. Also, the spillage resulting from carry angle variations during carrying can be reduced by reducing the angle variation.

Again, while generally effective for its intended purpose, the abovementioned apparatus nevertheless suffers a number of shortcomings.

In particular, in order to dump a loaded bucket, a substantial amount of energy is required to elevate either the front of the loaded bucket relative to the rear or vice versa.

The main problem, however, in a three rope system is that while theoretically providing a greater degree of control over the bucket carry angle over a greater boom slew radius, implementation of a control system to manage the relative rope tensions is considered to be an extremely difficult task.

Accordingly, it is an aim of the present invention to overcome or ameliorate at least some of the shortcomings or disadvantages of prior art dragline excavator control systems.

According to one aspect of the invention there is provided a dragline excavator bucket control system, said system comprising:

a pair of hoist ropes and a drag rope, said system characterized in that said hoist ropes are supported on said boom adjacent a free end thereof at spaced support positions and said hoist ropes are coupled adjacent opposite ends of a dragline bucket whereby said hoist ropes are substantially parallel and the line connecting said boom support points and the line connecting said bucket attachment points are substantially parallel when said bucket is in an optimal carry attitude for said bucket.

Suitably said control system comprises a support system having four spaced support points in side elevation forming a quadrilateral shape.

Preferably, in use, said four points of said support system define a substantially parallelogram shape.

Preferably said bucket, in use, is urged between a transport position and a dumping position by a dumping means, said dumping means being operable by lengthening one of said hoist ropes relative to the other hoist rope whereby gravitational forces cause movement of said bucket between a transport position and a dumping position.

If required, lengthening of one hoist rope relative to the other hoist rope may be effected by separately controllable hoist rope drums.

The separately controllable hoist rope drums may be operated by a common drive.

If required the separately controllable hoist rope drums may be operated by respective drives.

Suitably the separately controllable hoist rope drums may be coupled by a selective engagement mechanism to permit, in use, a predetermined degree of differential relative rotation between said separately controllable hoist rope drums.

The selective engagement mechanism may comprise a clutch mechanism.

Alteratively the selective engagement mechanism may comprise a differential gear assembly.

Alternatively, the bucket, in use, is urged between a transport position and a dumping position by relative movement between spaced upper support positions for said hoist ropes.

If required, a self compensating hoist rope take up system restores the bucket to a carry position under the influence of potential energy stored in said hoist rope take up system.

The self compensating hoist rope take up system may comprise a suspended mass.

If required, the take up system may comprise a spring biassing means.

Alternatively, the take up system may comprise a hydraulic biassing means.

Alternatively the bucket, in use, may be urged between a transport position and a dumping position by a powered system effective to cause relative shortening of one hoist rope relative to the other.

If required, one of said hoist ropes may be shortened relative to the other by a sheave mechanism contactable with said hoist rope.

Suitably, one of said hoist ropes may be shortened relative to the other by selective rotation of a sheave support arm pivotally mounted adjacent a free end of an excavator boom.

In order that the invention may be more readily understood and put into practical effect, reference is now made to a preferred embodiment described in the accompanying drawings in which.

Figure 1:
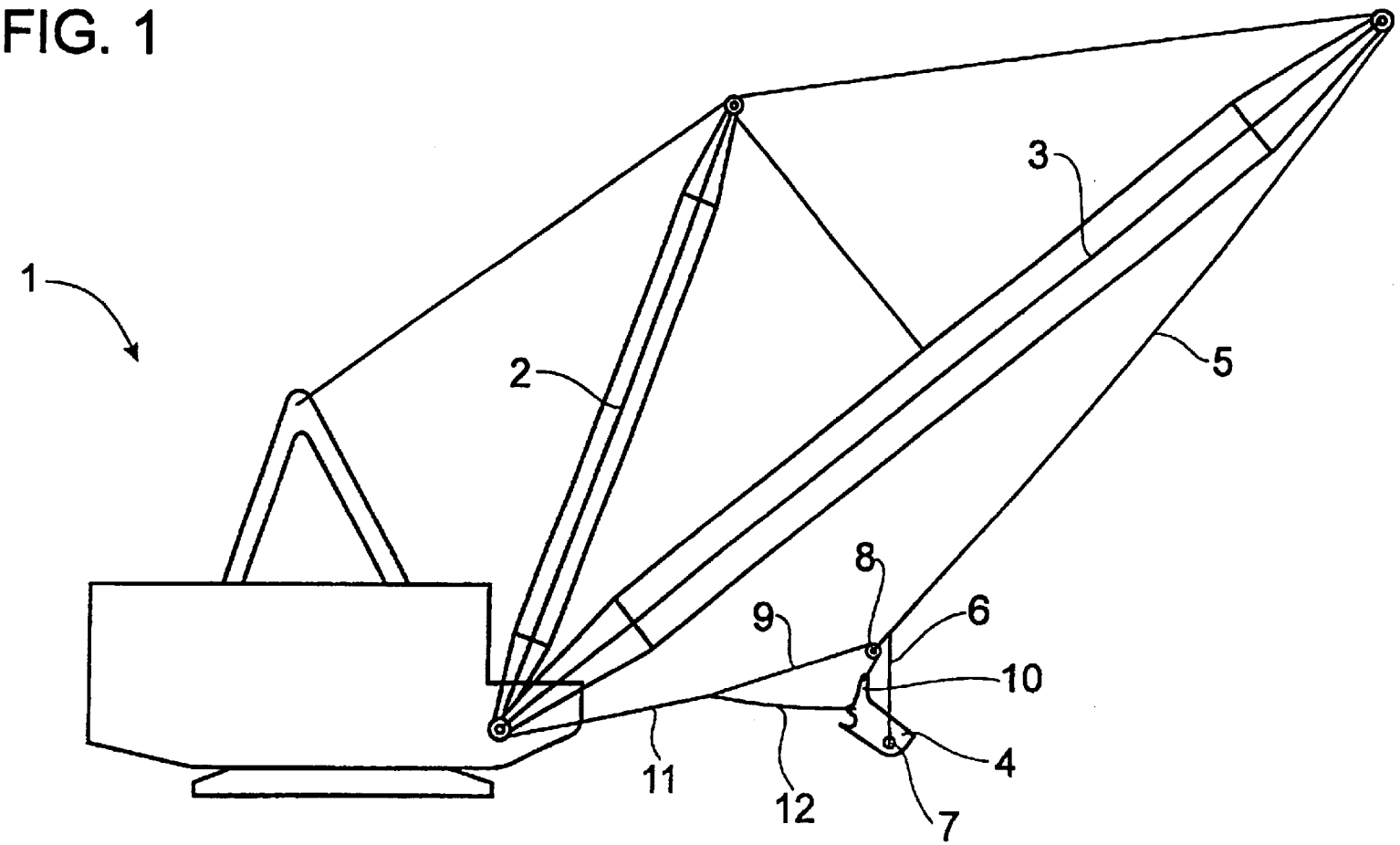
FIG. 1 Prior Art
FIG. 1 shows schematically in side elevation a conventional two rope bucket rigging system.

FIG. 1 shows schematically a conventional bucket excavator rigging wherein excavator 1 comprises a support mast 2, a boom 3 and a bucket 4 supported on a hoist rope 5 in turn connected to a hoist rope winch (not shown).

Hoist rope 5 terminates in a coupling (not shown) which connects hoist chains 6 to trunnions 7 towards the rear end of bucket 4. The coupling also connects a dump sheave 8 over which passes a dump control rope 9 connecting at one end to the arch 10 of bucket 4 and at its other end to a drag coupling (not shown) which couples the free end of a drag rope 11 to drag chains 12 connected to respective mounts (not shown) on bucket 4.

In use, the bucket carry angle is a function of the geometry of the various coupling points and respective tensions in the hoist rope, hoist chains, drag rope, drag chains and the control rope.

Figure 2:
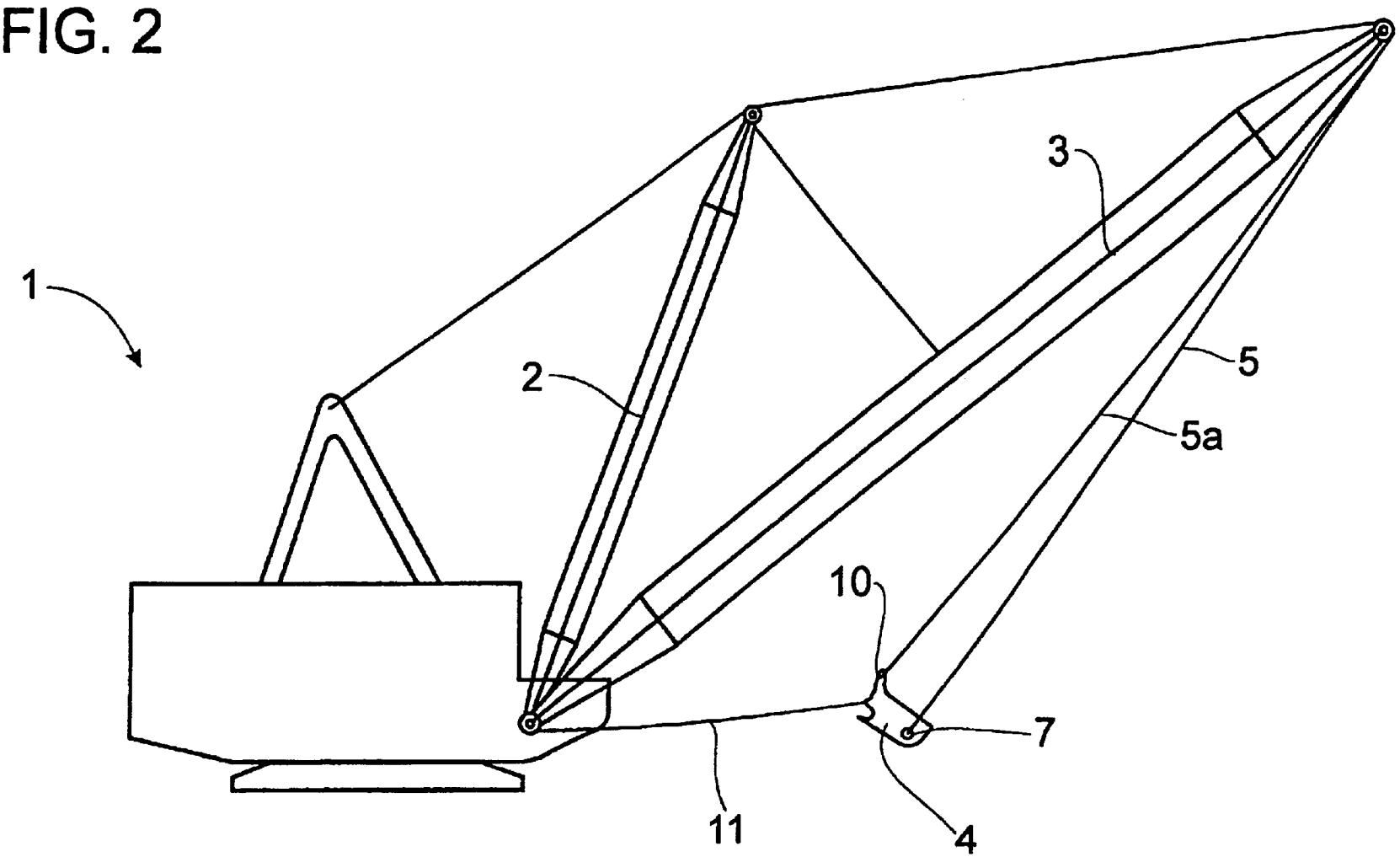
FIG. 2 shows schematically a prior art three rope 'triangulated' rigging proposal.

FIG. 2 shows schematically a three rope system of the type proposed in Australian Patent Application No 34502/89. In the drawings like reference numerals have been employed for like features.

As can be seen, the use of an additional hoist rope 5 may permit substantial savings in rigging mass by dispensing with the heavy hoist coupling (or equalizer), dump sheave, dump chains and dump control rope etc.

Figure 3:
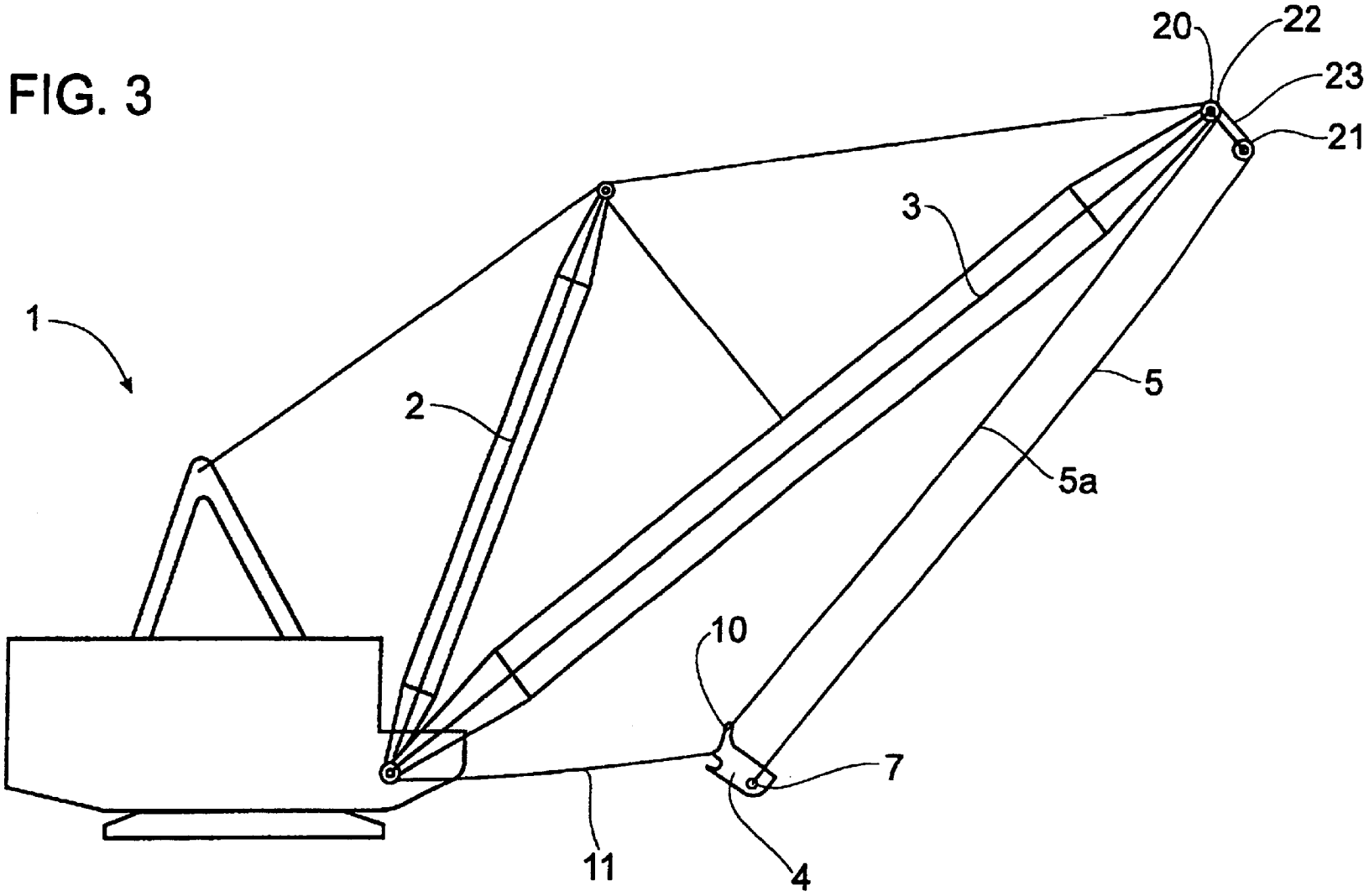
FIG. 3 shows schematically in side elevation a parallel rigging system according to the invention.

FIG. 3 shows schematically a side elevational view of a three rope system according to one aspect of the invention. Again, like reference numerals have been employed for like features.

In the embodiment shown a pair of hoist ropes 5, 5a are paid off opposite ends of a hoist winch (not shown) and respectively pass over a 'normal' boom sheave 20 and an 'extended' boom sheave 21 and a second boom sheave 22 mounted coaxailly with sheave 20.

'Extended' boom sheave 21 is mounted on a jib spacer frame 23 to space hoist ropes 5, 5a in a parallel manner as shown.

By suspending the bucket from front and rear trunnions by parallel hoist ropes of effectively substantially equal length, it will be apparent that the bucket carry attitude will not be influenced to a great extent by drag rope tension and thus independent control of hoist ropes 5, 5a for maintaining bucket attitude is alleviated.

Figure 4:
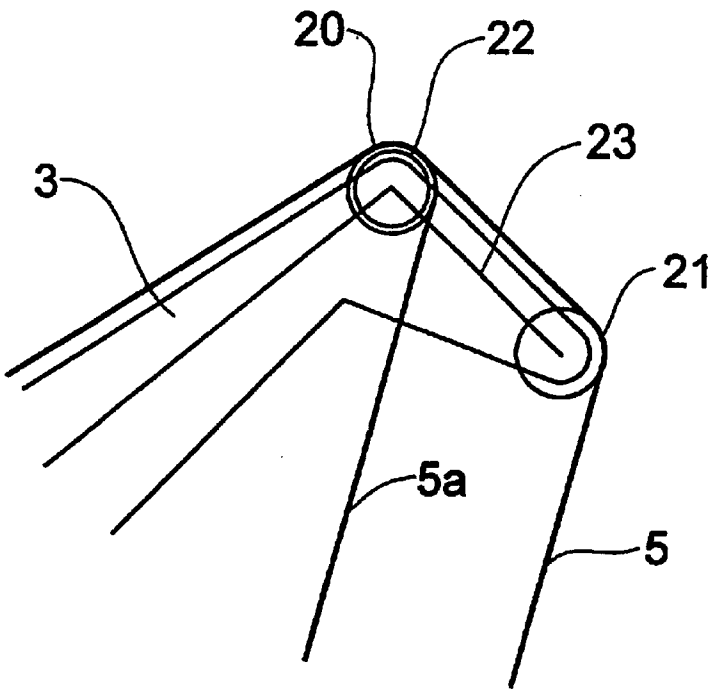
FIG. 4 shows one embodiment of a boom end adapted to support a pair of hoist ropes in a parallel configuration.

FIG. 4 shows schematically an enlarged view of the end of the boom illustrated in FIG. 3. The jib spacer frame 23 is rigidly mounted on boom 3.

Figure 5:
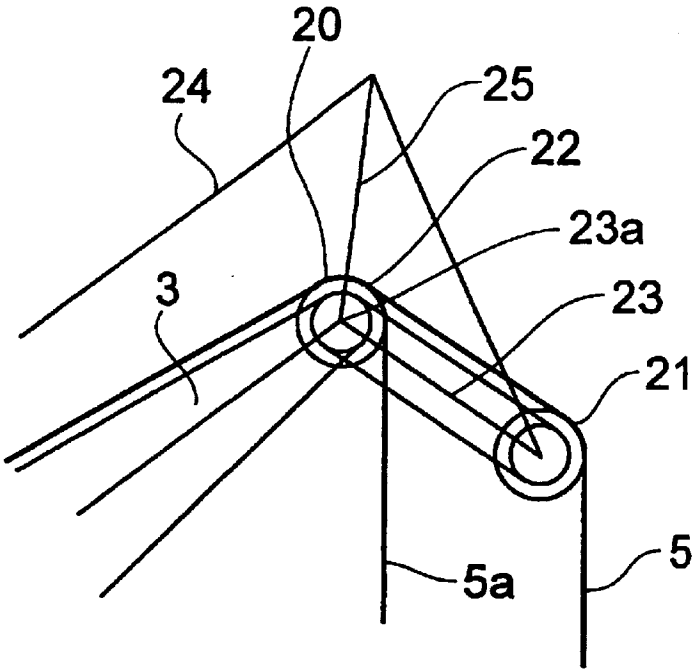
FIG. 5 shows an alternative embodiment of the arrangement of FIG. 4.

FIG. 5 shows an alternative embodiment to the arrangement of FIG. 4 wherein the jib spacer frame 23 is pivotally mounted at its inner end 23a to boom 3.

The angular position of frame 23, and thus the relative spacing between hoist ropes 5, 5a, may be adjustable by a tensionable cable 24 which extends over a spacer arm 25 attached to frame 23 and pivotable therewith. By adjusting the relative spacing between hoist ropes 5, 5a a parallel rope support can be provided for the bucket over a substantial extend of the boom to maximize bucket carrying capacity and to extend both excavation and dump radii.

If required the fixed jib spacer frame 23 of FIG. 4 may be telescopically adjustable to vary the spacing between hoist ropes 5, 5a as required. Alternatively the pivotable jib spacer frame 23 of FIG. 5 may be telescopically adjustable.

Figure 6:
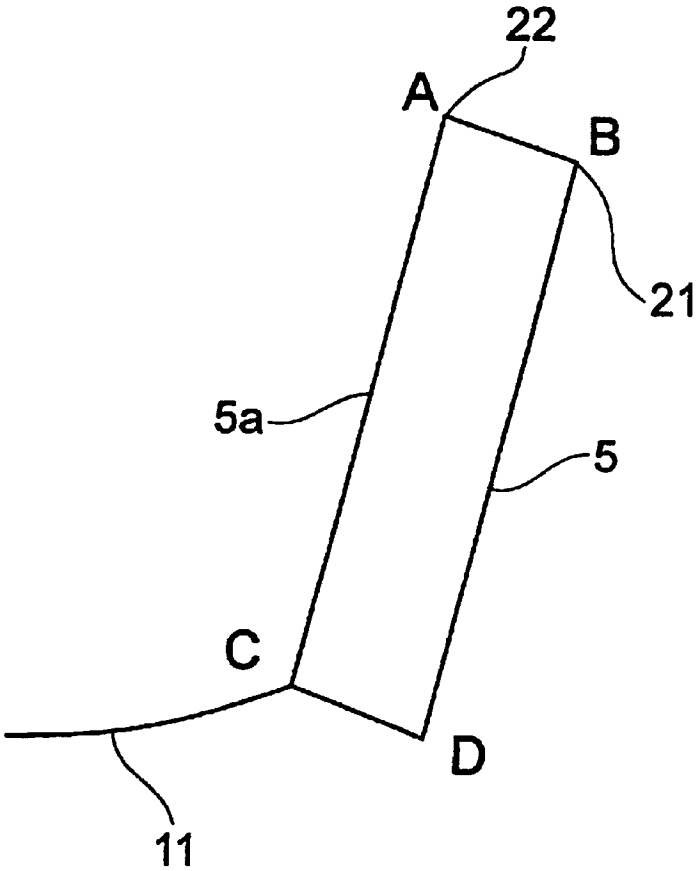
FIG. 6 shows schematically a side elevational representation of a parallel bucket rigging.

FIG. 6 shows in a schematic sense the parallelogram shape defined by the four support points for the bucket.

Point A represents sheave 22, point B represents sheave 21 as shown in FIGS. 3, 4 and 5, while points C and D represent respectively front and rear bucket trunnions.

Figure 7:
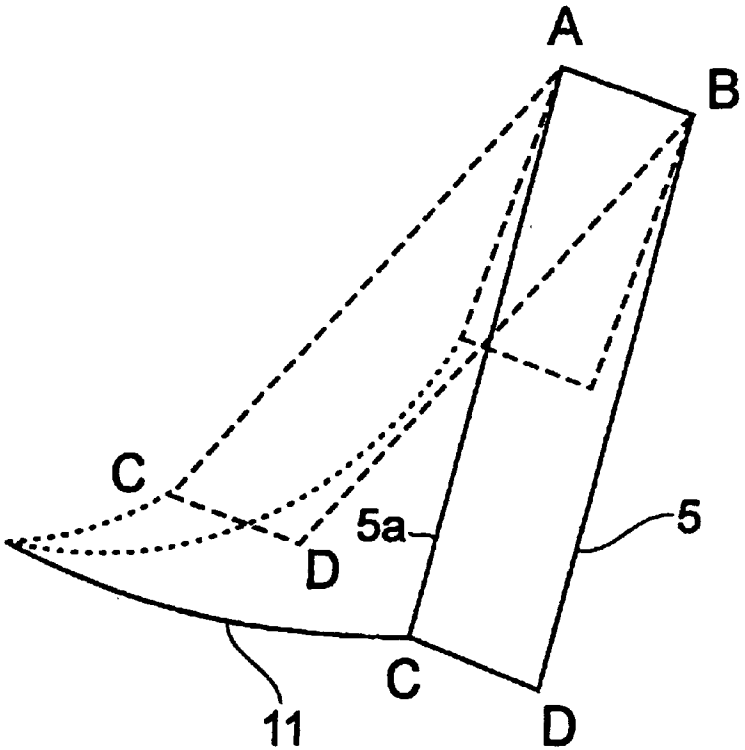
FIG. 7 shows schematically the maintenance of bucket attitude as the drag rope is tensinoed to move the bucket.

FIG. 7 shows that as the drag rope 11 is tensioned to carry the bucket inwardly and upwardly to the position shown in phantom, the angle of the front and rear bucket trunnions, represented by the line extending between points C and D, remains substantially constant.

Figure 8:
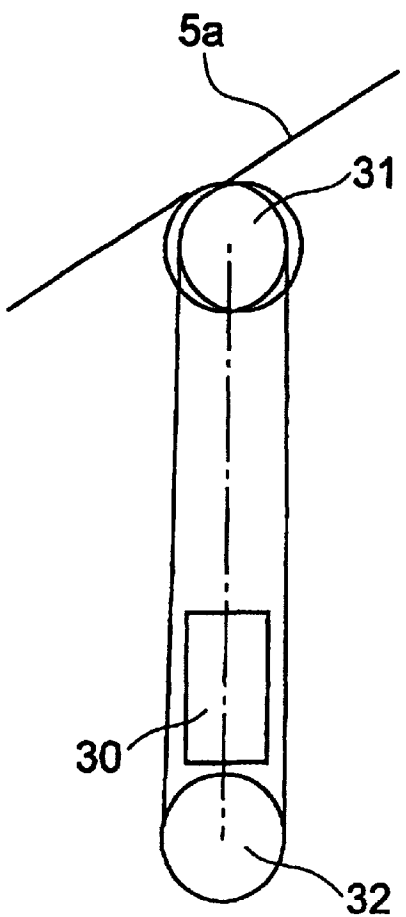
FIG. 8 shows schematically one form of self compensating take up system for rigging the bucket after dumping.

FIG. 8 shows a suspended mass 30 coupled, say, to hoist rope 5a via a pair of fixed sheaves 31 attached to the excavator (not shown) and a floating sheave 32 to which the mass 30 is attached.

With floating sheave 32 in an extended position as shown to take up slack in rope 5a, a sheave brake (not shown) or other suitable braking mechanism associated with fixed sheave 31 is engaged to retain the fixed and floating sheaves 31, 32 in their relative positions in turn to maintain the bucket carry attitude as shown generally in FIGS. 6 and 8.

When the bucket is full and positioned over a desired dump zone, the sheave brake associated with sheave 31 is disengaged to allow rope 5a to be paid out.

As rope 5 is stationary and maintains a fixed tension on the winch drum, the gravitational force of the loaded bucket forward of the rear hoist trunnions is such as to cause the bucket to tilt about the rear hoist trunnions as the tension in the rope 5a overcomes the restoring force of mass 30. The buckets rotates about its rear trunnions to an upright position to dump its load and when the bucket is empty, the mass 30 is sufficient to apply a restoring force against the forward portion of the bucket to take up stack in rope 5a to return the bucket to a normal carry position to continue the excavation process. Once the bucket has returned to the normal carry attitude, the sheave brake, or the like, is again engaged to lock the take up system.

Figure 9:
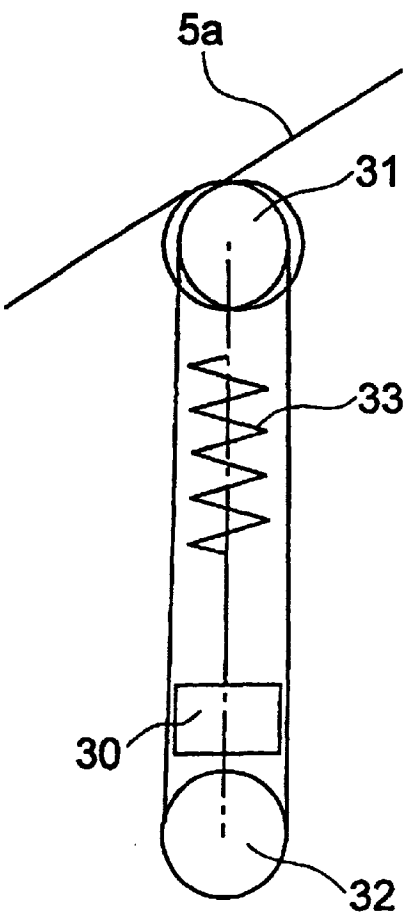
FIG. 9 shows an alternative to the embodiment of FIG. 8.

FIG. 9 shows an alternative embodiment of the system of FIG. 8. In this embodiment, the mass 30 is reduced and is combined with a spring mechanism 33 which, when compressed, provides a restoring force to return the bucket to its normal carry attitude. The spring mechanism may, for example, comprise a compression/tension spring of fixed or variable rate and include a damper during pay out or take up of slack during the bucket dump and restoration steps.

Figure 10:
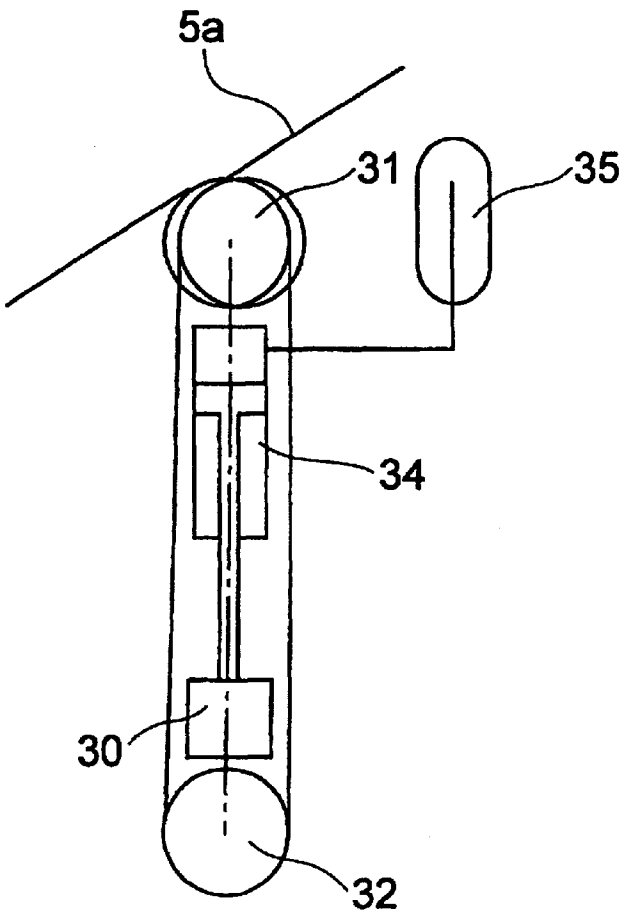
FIG. 10 shows yet another alternative to the device of FIG. 8 or FIG. 9.

FIG. 10 shows yet another embodiment incorporating a mass 30, a hydraulic piston/cylinder assembly 34 and a pressure accumulator 35.

Like the apparatus of FIGS. 8 and 9, the restoring forces of mass 30 and the pressurized accumulator 35 are sufficient to return an empty bucket to its normal carry attitude but are insufficient to resist the tensile load applied to rope 5a when the bucket is full. The hydraulic mechanism of FIG. 10 can be adapted to provide finely tuned dumping in both the cable slack pay out and take up modes. The hydraulic mechanism can also be used to provide the sheave locking functions.

Figure 12:
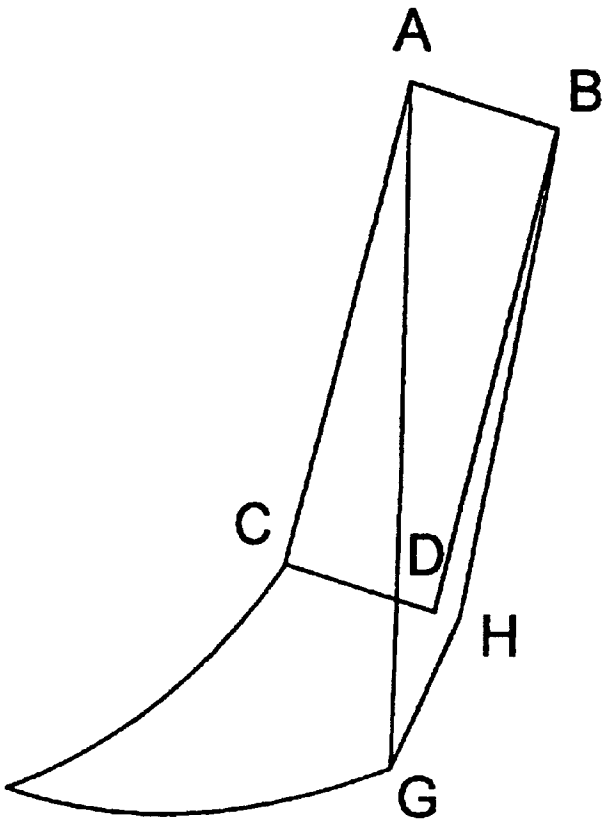
FIG. 12 shows schematically an alternative means of dumping a bucket by changing relative hoist rope lengths.
Figure 11:
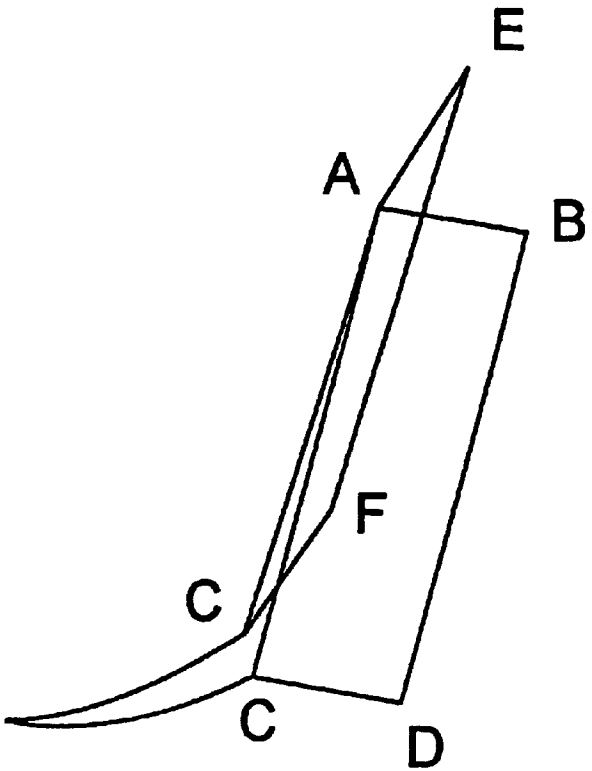
FIG. 11 shows schematically a means of dumping a bucket by relative movement between upper supports of respective hoist ropes.

FIGS. 11 and 12 show schematically the alternative bucket dumping modes according to he invention.

In FIG. 11 the parallelogram shape represented by points A B C D will move to the parallelogram shape represented by points A C E F when the upper support points A and B are rotated relative to each other. For example, this dumping mode may be effected by the embodiment of FIG. 5 where the take up mechanism is coupled to control cable 24 to move support point B in the parallelogram shape.

While FIG. 11 shows pivoting of support points about point A, the pivoting could be about any point between points A and B, or near them. Some pivot points, in particular, will allow dumping and return to the desired carry angle through the balance of forces on the full and empty buckets and without extra power application required.

FIG. 12 shows the change from carry attitude parallelogram points A B C D to dump quadrilateral points A B G H when the relative lengths of support ropes 5, 5a change. In this embodiment, any of the take up units of FIGS. 8, 9 or 10 could be employed to cause hoist rope 5a to lengthen to enable the bucket to dump its load.

FIGS. 13, 13a and 14, 14a show alternative dumping mechanisms in a schematic sense.

Figure 13:
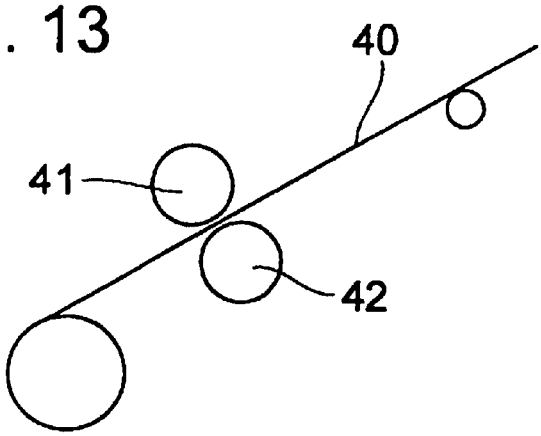
FIGS. 13, 13a show a powered hoist rope shortening mechanism.
Figure 13A:
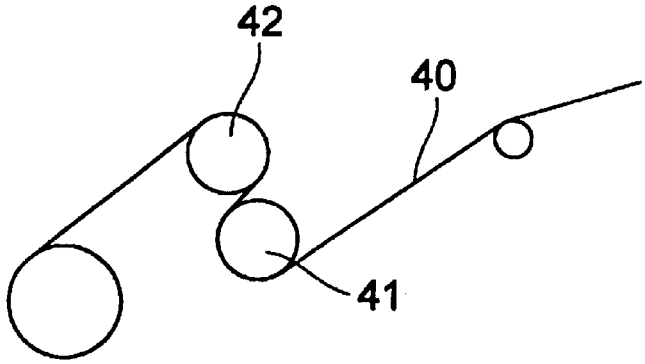

In FIG. 13 one of the hoist ropes 40, either the front or rear, may be passed between a pair of sheaves 41, 42 mounted on a rotatable frame (not shown) attached to the boom of the excavator. It will be noted that to reduce rope wear, sheaves 41, 42 are not normally in contact with hoist rope 40.

When it is required to dump the excavator bucket the hoist rope 40 is shortened relative to the other hoist type (not shown) by rotating the frame, to which sheaves 41, 42 are attached, through about up to 180° whereby the sheaves contact the hoist rope and impart a pair of loops therein to shorten that rope relative to the other hoist rope to effect either front or rear dumping from the bucket.

Figure 14:
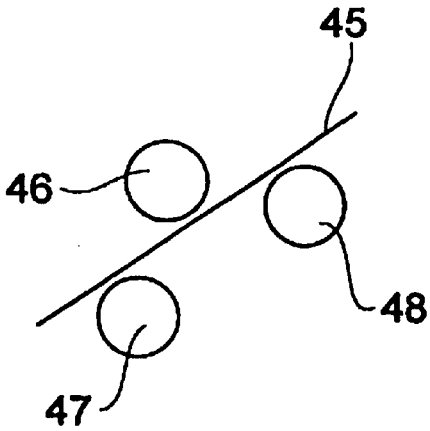
FIGS. 14, 14a show an alternative powered hoist rope shortening mechanism.
Figure 14A:
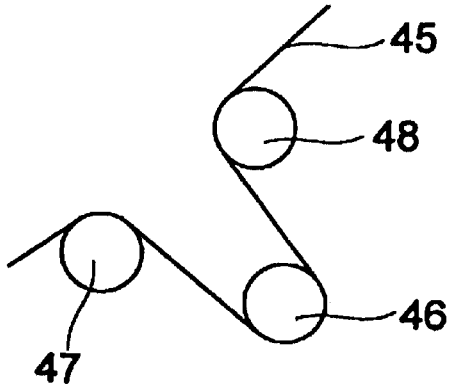

FIGS. 14, 14a show an alternative rope shortening mechanism wherein rope 45 normally passes between sheaves 46, 47, 48 without contact.

When it is desired to dump the bucket by shortening hoist rope 45 relative to the other rope (not shown), sheave 46 is urged between sheaves 47 and 48 by a suitable mechanical or fluid powered means to form a shortening loop in hoist rope 45.

Figure 15:
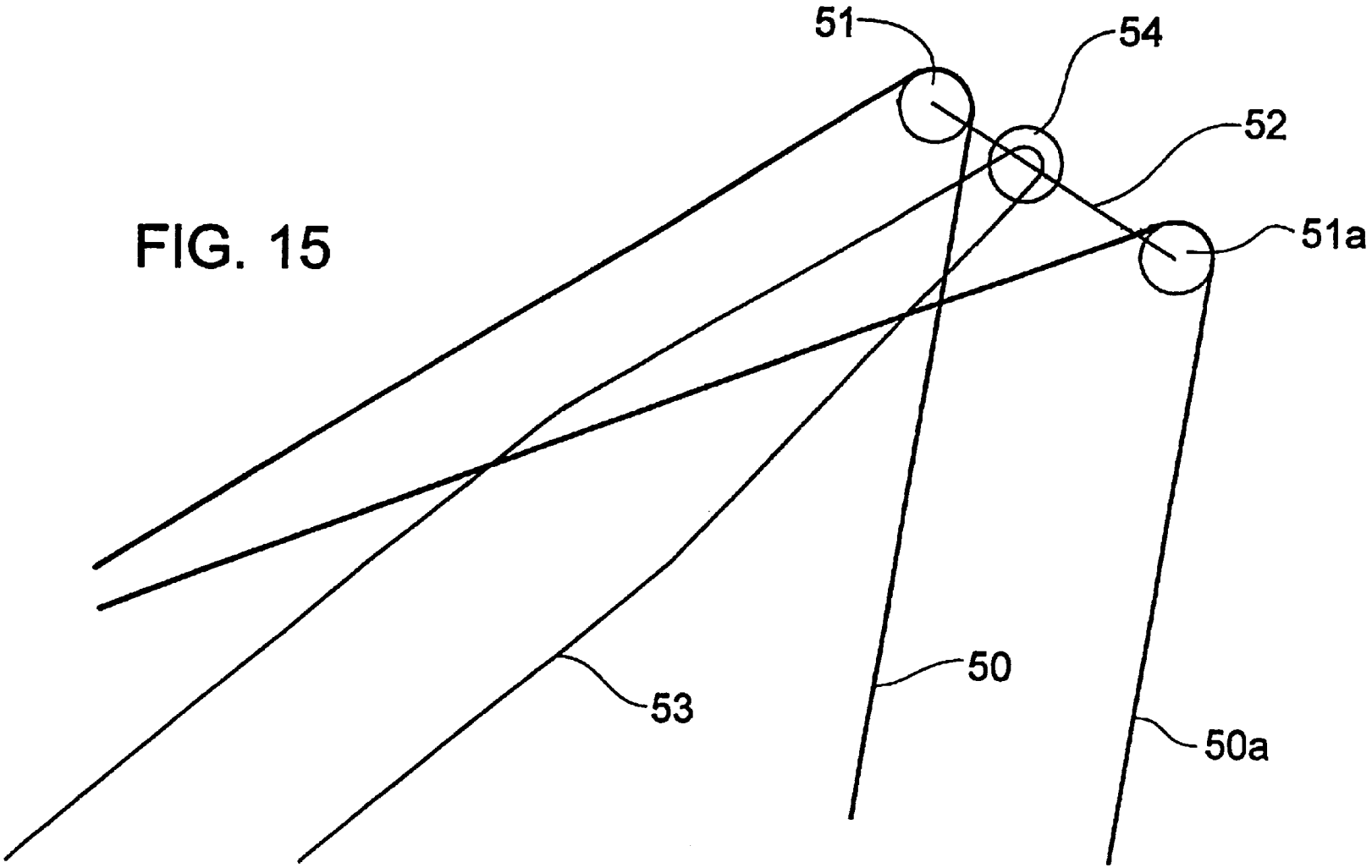
FIG. 15 shows yet another mechanism for effecting relative shortening of one hoist rope to the other.

FIG. 15 shows schematically an alternative embodiment to that shown in FIG. 5.

Hoist ropes 50, 50a pass over respective sheaves 51, 51a mounted at opposite ends of a jib spacer frame 52 which is pivoted intermediate its ends to boom 53 about the pivotal axis of "normal" sheave 54 or at least on a pivot pin occupying the pivotal axis 55 previously occupied by sheave 54.

A pivot bearing (not shown) associated with jib spacer frame 52 may be slidably mounted in jib spacer frame 52 to selectively position the pivotal axis of frame 52 closer to one of sheaves 51, 51a as required.

If required either or both of the portions of jib spacer frame 52 lying on opposite sides of pivotal axis 55 are telescopically adjustable by mechanical and/or hydraulic mechanisms.

Figure 16:
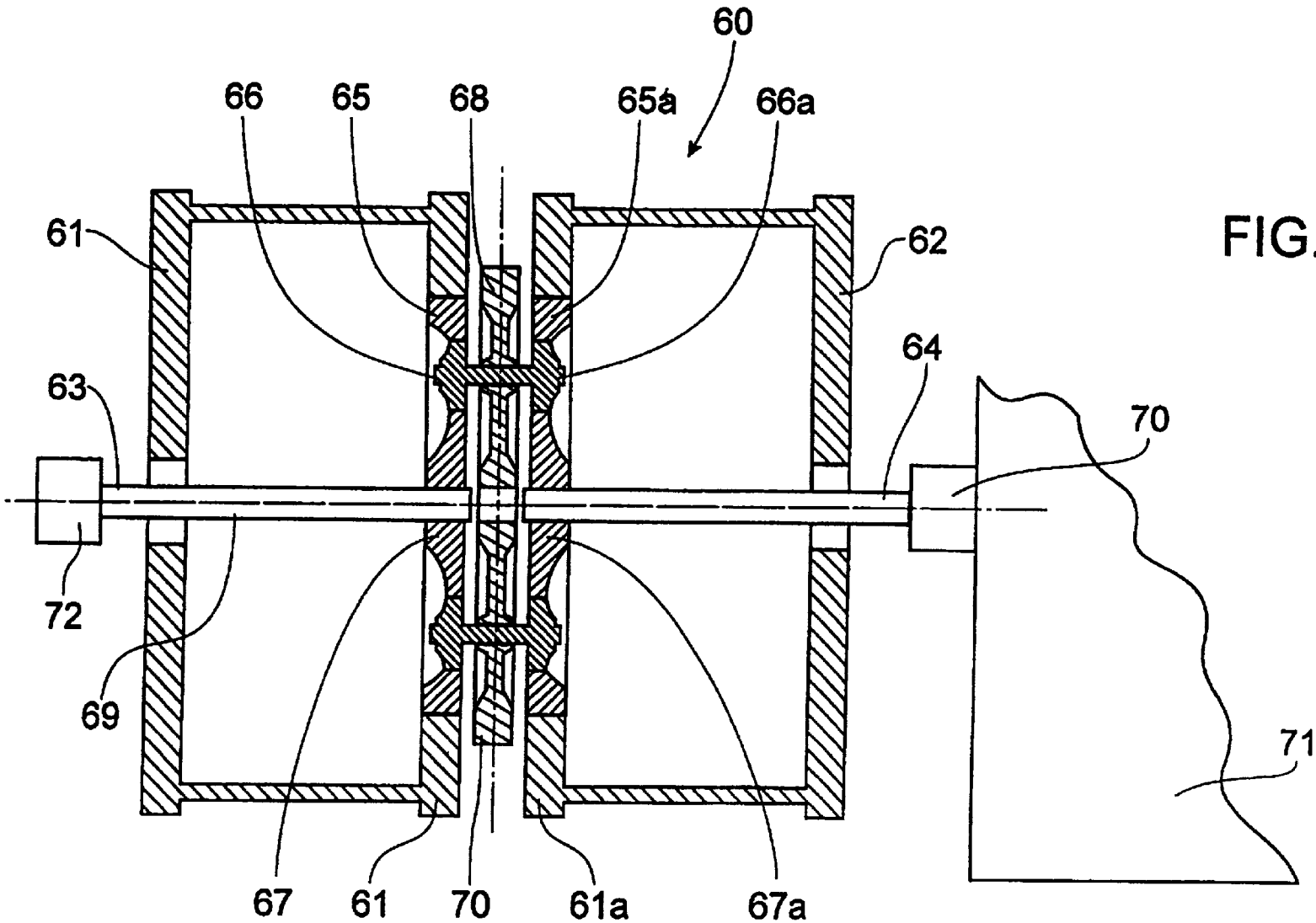
FIG. 16 shows schematically one form of separately controllable hoist rope drums.

FIG. 16 shows schematically a cross sectional elevation of a hoist rope control system having separately controllable hoist rope drums.

The drive system 60 includes hoist rope drums 61, 62 rotatable on respective drive shafts 63, 64. Ring gears 65, 65a are secured into facing drum wall flanges 61a, 62a which ring gears 65, 65a are coupled to planetary gears 66, 66a in turn coupled to drive gears 67, 67a keyed or otherwise secured on respective drive shafts 63, 64. Planetary gears 66, 66a in turn coupled to drive gears 67, 67a keyed or otherwise secured on respective drive shafts 63, 64. Planetary gears 66, 66a are secured in a planet cage 68 for rotation about an axis 69 in which drive shafts 63, 64 lie. Plant cage 68 suitably includes gear teeth extending about its outer periphery for engagement by a drive train (not shown) coupled to a drive motor or the like (not shown).

Rotation of planet cage 68 causes rotation of drums 61, 62 by a differential action whereby when shafts 63, 64 rotate or are constrained to rotate at the same speed, the rotational speed of drums 61, 62 will be the same. By controlling shafts 63, 64 to operate at differing relative rates of rotation, drums 61, 62 will selectively rotate at different speeds. Selective control of hoist rope drum rotational speeds therefore can be employed to selectively change the relative lengths of the front and rear hoist ropes to urge the bucket from a transport attitude to a dumping position as required.

For example shaft 64 may be secured against rotation by a selective engagement mechanism such as a lockable dog clutch or keyed coupling 70 secured to the dragline structure 71. Shaft 63 is coupled to a selective engagement mechanism 72 such as a friction clutch, powered worm wheel gear train or any suitable mechanism to permit selective locking of drum 61 on selective rotation in either direction of drum 61 relative to drum 62.

Figure 17:
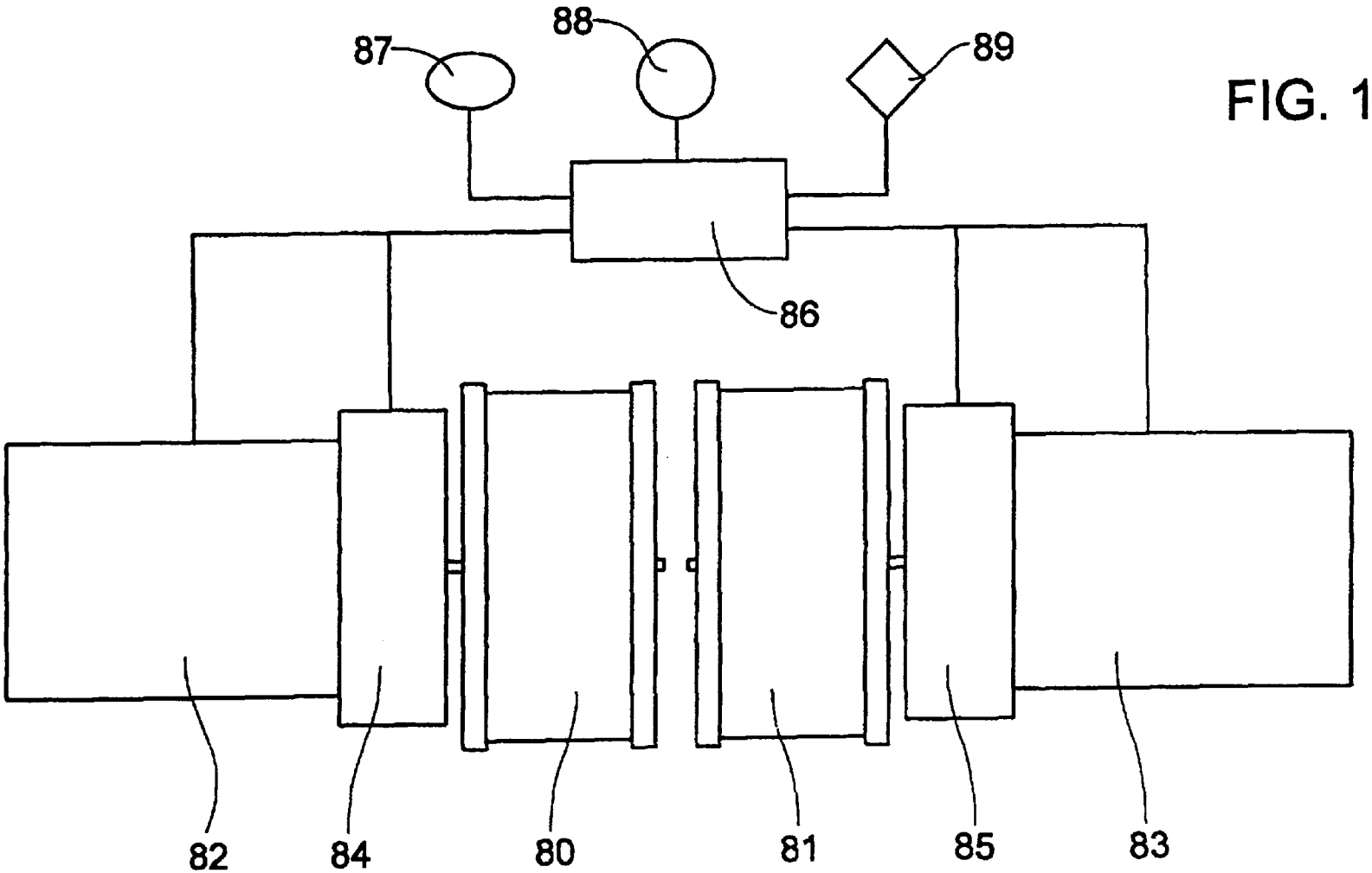
FIG. 17 shows an alternative embodiment to that of FIG. 16.

FIG. 17 shows schematically an arrangement for independent driving of hoist rope drums.

The hoist rope control system comprises separate hoist rope drums 80, 81 coupled to respective drive motors 82, 83 by respective gearboxes or power transmission mechanisms 84, 85.

Selective relative rotation between drums 80, 81 may be effected by control of drive motors 82, 83 and/or by selective control of power transmission mechanisms 84, 85.

Hoist rope control may be effected by a computer 86 coupled to drive motors 82, 83 and/or power transmission mechanisms 84, 85 to coordinate hoist rope control for translational movement of a loaded bucket at an optimum transport or carry angle for that particular bucket and also to control dumping of the bucket at a predetermined position with precision. A plurality of sensors 87, 88, 89 may also be coupled to computer 86 to provide information relating to such characteristics as boom slew angle, boom elevation angle, hoist rope tensions, status of hoist rope length control mechanisms, actual bucket travel or carry angle, boom slew velocity, hoist rope cable speed or the like.

From the foregoing description it will be apparent that the 'parallel' rigging arrangement in combination with the cable take up unit provides substantial improvements over prior art dragline bucket rigging systems. These improvements include increased bucket payload through reduced rigging mass, increased efficiency through reduced spillage from the bucket, greater excavator range and greater dump zone range.

Possibly the most significant advantage is that with relatively inexpensive adaptations to a conventional dragline excavator, all of the above improvements may be achieved along with a more energy efficient bucket dumping method which relies on the potential energy in a loaded bucket to dump the load and stored potential energy in a rope take up system to restore the bucket automatically to the correct carry attitude.

A rear dumping bucket is preferred as it is readily dumped at any position between adjacent the fairleads of the excavator and the boom tip. At the boom tip, a rear dumping bucket can increase the effective dumping radius by about 3–4 meters compared with a front dumping bucket.

Generally speaking while the apparatus descried herein can be adapted to dump either from the front or the rear of a bucket, front dumping is generally only effective for the outer half of the excavator boom.

By employing a rear dumping mode of operation by shortening the front hoist rope relative to the rear hoist rope, excessive tensions in the rear hoist rope are avoided and generally rope life can be extended.

It readily will be apparent to a person skilled in the art that many modifications and variations may be made to the various embodiments described herein without departing from the spirit and scope of the invention.

For example, the excavator may include a single hoist rope winch with a single drive for a pair of hoist ropes. Alternatively, the winch may include multiple drums with independent drives or combinations thereof. In such an example, the winch drums may be operated in unison for the dig and carry operations and separately to control dumping functions and/or carry angle of the bucket.

Although a number of alternative mechanisms are described herein for effecting relative lengthening or shortening between the spaced hoist ropes, it also will be apparent to a person skilled in the art that various combinations of relative rope length changing mechanisms may be employed to control bucket carry angle and/or bucket dumping functions.

What is claimed is:

1. A dragline excavator bucket control system, said system comprising:

a pair of hoist ropes and a drag rope, respective free ends of said hoist ropes being coupled adjacent opposite ends of a dragline bucket and said drag rope being coupled adjacent a front end of said dragline bucket, said hoist ropes being supported on an excavator boom on spaced respective inner and outer boom sheaves; and a boom sheave support arm mounted adjacent a free end of said excavator boom to support said outer boom sheave to one side of a longitudinal axis of said boom whereby, in use, said pair of hoist ropes extending between respective sheaves and respective couplings to said bucket remain substantially parallel to retain said bucket in an optimal transport attitude when moving between a retracted and an extended position under the influence of said drag rope.

2. A control system as claimed in claim 1 wherein in use, respective hoist rope boom support points and respective hoist rope bucket attachment points together define a substantially parallelogram shape in side elevation.

3. A control system as claimed in claim 1 wherein said boom sheave support arm is rigidly mounted on said boom.

4. A control system as claimed in claim 1 wherein said boom sheave support arm is pivotally mounted on said boom.

5. A control system as claimed in claim 1 wherein said bucket, in use, is urged between a transport position and a dumping position by a dumping mechanism, said dumping mechanism being operable by lengthening one of said hoist ropes relative to the other hoist rope whereby gravitational forces cause movement of said bucket between a transport position and a dumping position.

6. A control system as claimed in claim 5 wherein lengthening of one hoist rope relative to the other hoist rope is effected by separately controllable hoist rope drums.

7. A control system as claimed in claim 6 wherein the separately controllable hoist rope drums are operated by a common drive.

8. A control system as claimed in claim 6 wherein the separately controllable hoist rope drums are operated by respective drives.

9. A control system as claimed in claim 6 wherein the separately controllable hoist rope drums are coupled by a selective engagement mechanism to permit, in use, a predetermined degree of differential relative rotation between said separately controllable hoist rope drums.

10. A control system as claimed in claim 9 wherein the selective engagement mechanism comprises a clutch mechanism.

11. A control system as claimed in claim 9 wherein the selective engagement mechanism comprises a differential gear assembly.

12. A control system as claimed in claim 4 wherein the bucket, in use, is urged between a transport position and a dumping position by pivotal movement of said boom sheave support arm to effect a lengthening of one of said hoist ropes relative to the other hoist rope whereby gravitational forces cause movement of said bucket between a transport position and a dumping position.

13. A control system as claimed in claim 5 wherein a self-compensating hoist rope take up system restores the bucket to a carry position under the influence of potential energy stored in said hoist rope take up system.

14. A control system as claimed in claim 13 wherein the self-compensating hoist rope take up system comprises a suspended mass.

15. A control system as claimed in claim 13 wherein the take up system comprises a spring biassing mechanism.

16. A control system as claimed in claim 13 wherein the take up system comprises a hydraulic biassing mechanism.

17. A control system as claimed in claim 13 wherein said hydraulic biassing system includes a pressure accumulating chamber.

18. A control system as claimed in claim 13 wherein the self-compensating take up system is selected from a suspended mass, a spring biassing mechanism, a hydraulic biassing mechanism, or combinations thereof.

19. A control system as claimed in claim 5 wherein the bucket, in use, is urged between a transport position and a dumping position by a powered system effective to cause relative shortening of one hoist rope relative to the other.

20. A control system as claimed in claim 19 wherein one of said hoist ropes is shortened relative to the other by a respective powered hoist rope drum.

21. A method of operating a dragline excavator wherein a pair of hoist ropes are coupled adjacent opposite ends of a dragline bucket, said hoist ropes being supported on an excavator boom on spaced respective inner and outer boom sheaves, said outer boom sheave being supported by a boom sheave support arm to one side of a longitudinal axis of said excavator boom whereby, in use, said pair of hoist ropes extending between respective sheaves and respective couplings to said bucket remain substantially parallel to retain said bucket in an optimal transport attitude when moving between a retracted and an extended position under the influence of a drag rope coupled to said bucket.

22. A method as claimed in claim 21 wherein said bucket is urged between a transport position and a dumping position by selectively lengthening or shortening of one of said pair of hoist ropes relative to the other hoist rope of said pair.

23. A method as claimed in claim 21 wherein each of said pair of hoist ropes is coupled to a respective separately controllable hoist rope drum.

24. A method as claimed in claim 23 wherein each hoist rope drum is selectively operable from a common drive.

25. A method as claimed in claim 23 wherein each hoist rope drum is selectively operable by a respective drive.

* * * * *